United States Patent Office 3,451,852
Patented June 24, 1969

3,451,852
METHOD OF PRODUCING ELECTRICITY IN A FUEL CELL USING A HYDRAZINE FUEL AND GROUP 8 METAL PHOSPHIDES AS CATALYSTS
Edward F. Steigelmann, Park Forest, Ill., assignor to Chevron Research Company, San Francisco, Calif., a corporation of Delaware
No Drawing. Filed Jan. 25, 1966, Ser. No. 522,830
Int. Cl. H01m 27/04, 43/04
U.S. Cl. 136—86    1 Claim

ABSTRACT OF THE DISCLOSURE

A method of producing electricity in a fuel cell including Group 8 metal phosphides as catalysts for fuel cell anodes with an oxygen counter electrode, a basic electrolyte and hydrazine fuel.

---

This invention concerns novel fuel cell electrodes. More particularly, this invention concerns Group 8 metal phosphides which find use as electrodes in fuel cells.

Fuel cells as a source of power have many attractive features. The basic unit is noiseless, generates less heat and toxic fumes than do internal combustion engines and has no moving parts. While similar to batteries, the fuel cell basic unit does not need recharging. For extended operations, the fuel cell plus fuel is lighter in weight than batteries which are capable of providing the same amounts of electrical energy. Within a practical temperature range, the fuel cell is thermally more efficient than a Carnot heat cycle engine.

According to this invention, nickel and cobalt phosphide electrodes are provided as anodes or fuel electrodes to be used in a basic electrolyte with hydrazine as fuel. While an acidic electrolyte may be used, the basic electrolyte under a given set of conditions allows larger currents to be drawn.

The electrode material of this invention, namely the nickel and cobalt phosphides, are designed for use in fuel cells which employ oxygen (including mixtures containing oxygen, e.g., air) as the oxidant, using a convenient material, e.g., platinum, as the cathodic electrode and cobalt or nickel phosphide as the anode. As already indicated, hydrazine is employed as a fuel and while either a basic or acidic electrolyte may be used, the basic electrolyte is preferred. Convenient basic electrolytes are sodium hydroxide, potassium hydroxide, etc.

The molar concentration of the fuel—hydrazine—will generally be in the range of 1% to 10%, more usually about 5%. Concurrently, the molar concentration of the electrolyte will generally be in the range of 1 M to 10 M.

Various designs have been disclosed in the patent and scientific literature of fuel cells. The electrodes of this invention may be adapted to any conveniently designed fuel cell.

The phosphides are readily prepared by vacuum fusion. After drying, stoichiometric (2:1 molar) amounts of the elements—nickel or cobalt powder with red phosphorus powder—are sealed in an evacuated quartz tube and slowly heated to 850° C. The mixtures are maintained at this temperature for about 48 hours and then slowly cooled. The resulting substances are powders consisting of gray hard particles.

Test electrodes are prepared on carbon disks which are about ½" in diameter. The alloy is sprinkled on the carbon disk and a very dilute solution of Lucite (a commercially available polymethacrylate) in acetone is poured over the powder. This bonds the powder to the carbon disk and yet apparently does not completely cover the catalyst particles on the carbon disk. While this is not the optimum method of preparing an electrode, it provides a convenient method for preparing a sample for testing.

Electrochemical tests were made in a three compartment electrolytic cell. The three compartments—working electrode, counter electrode and reference electrode—were separated with sintered glass disks to prevent mixing of the solutions in the compartments. One-half of the carbon electrode was immersed in the solution of the working electrode compartment to make the electrochemical test. The electrochemical measurements were made with a Wenking potentiostat. Currents were recorded as a function of time for each potential on a Sargent MR recorder. One normal sodium hydroxide and 0.5 molar hydrazine were chosen as a basic test solution and a standard Calomel electrode (SCE) was used as the standard electrode. The temperature was maintained at 80° C. The following table indicates the results obtained.

TABLE

| | Potential, volt vs. SCE | | | | | |
|---|---|---|---|---|---|---|
| | −0.4 | | −0.6 | | −0.8 | |
| | N.P. | C.P. | N.P. | C.P. | N.P. | C.P. |
| Current density, ma./cm.$^2$ | 135 | 27 | 90 | 27 | 50 | 25 |

N.P.—nickel phosphide; C.P.—cobalt phosphide.

It is evident from the above table that both nickel phosphide and cobalt phosphide are active catalysts for the use of hydrazine as a fuel in fuel cells. The nickel phosphide and cobalt phosphide therefore provide alternatives as compositions for fuel cell electrodes, particularly as substitutes for the noble metals, e.g., platinum. While the above results were not carried out at optimum conditions and do not, therefore, provide an indication of the maximum power capability of the nickel phosphide and cobalt phosphide as catalysts, they are indicative of the usefulness of these materials as catalysts.

As will be evident to those skilled in the art, various modifications on this invention can be made or followed, in the light of the foregoing disclosure and discussion, without departing from the spirit or scope of the disclosure or from the scope of the following claim.

I claim:
1. A method of producing current from a fuel cell which comprises oxidizing hydrazine at an anode having nickel or cobalt phosphide as the catalyst, using a basic electrolyte and an oxygen counter electrode.

References Cited

UNITED STATES PATENTS 2,921,110  1/1960  Crowley et al. _____ 136—86
2,966,427  12/1960  Breining _____ 23—204 X ALLEN B. CURTIS, Primary Examiner.

U.S. Cl. X.R.
136—120